(12) United States Patent
Forbord et al.

(10) Patent No.: US 6,650,501 B2
(45) Date of Patent: Nov. 18, 2003

(54) HIGHER INTER-DISC SEPARATIONS TO IMPROVE DISC DRIVE ACTUATOR SERVO PERFORMANCE

(75) Inventors: Kent Jon Forbord, St. Louis Park, MN (US); Brian Robert Pollock, Eden Prairie, MN (US); Joshua Ward Christensen, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 186 days.

(21) Appl. No.: 09/967,672

(22) Filed: Sep. 28, 2001

(65) Prior Publication Data

US 2003/0007284 A1 Jan. 9, 2003

Related U.S. Application Data

(60) Provisional application No. 60/303,581, filed on Jul. 5, 2001.

(51) Int. Cl.$^7$ ............................................. G11B 17/18
(52) U.S. Cl. ............................. 360/97.01; 360/98.08; 360/99.12
(58) Field of Search ........................ 360/97.01, 97.02, 360/98.08, 99.12

(56) References Cited

U.S. PATENT DOCUMENTS

| | | |
|---|---|---|
| 5,596,461 A | 1/1997 | Stefansky |
| 5,602,700 A | 2/1997 | Viskochil et al. |
| 5,696,649 A | 12/1997 | Boutaghou |
| 5,856,624 A | 1/1999 | Elsing |
| 5,870,254 A | 2/1999 | Baserman et al. |
| 5,872,673 A | 2/1999 | Purkett |
| 5,898,545 A | 4/1999 | Schirle |
| 5,956,203 A | 9/1999 | Schirle et al. |
| 6,097,568 A | 8/2000 | Ekhoff |
| 6,236,533 B1 | 5/2001 | Forbord et al. |
| 6,307,706 B1 * | 10/2001 | Krum ..................... 360/98.08 |
| 6,373,649 B1 * | 4/2002 | Walker ..................... 360/69 |

* cited by examiner

Primary Examiner—A. J. Heinz
(74) Attorney, Agent, or Firm—Derek J. Berger

(57) ABSTRACT

To alleviate excessive non-repeatable runout (NRRO) on heads between discs, an original multi-disc design is adapted by (a) reducing the number of discs in the stack and (b) configuring the disc drive of the adapted design with a larger nominal inter-disc separation than that of the original design. In one embodiment, the larger separation is maintained by an increased number of disc spacers between each consecutive pair of the discs in the disc stack of the modified design. The result of such a design adaptation is a disc drive with better performance characteristics than would exist by the original design.

30 Claims, 6 Drawing Sheets

HIGHER INTER-DISC SEPARATIONS TO IMPROVE DISC DRIVE ACTUATOR SERVO PERFORMANCE

RELATED APPLICATIONS

This application claims priority of U.S. provisional application Serial No. 60/303,581, filed Jul. 5, 2001.

FIELD OF THE INVENTION

This application relates generally to data storage devices and more particularly to an apparatus and method for improving disc drive actuator servo performance.

BACKGROUND OF THE INVENTION

Computers commonly use disc drives or tape drives to store large amounts of data in a form that can be readily accessed by a user. A disc drive generally includes a stack of vertically spaced magnetic discs that are rotated at high speed by a spindle motor. The surface of each disc is divided into a series of concentric, radially spaced data tracks in which the data are stored in the form of magnetic flux transitions. Typically, each data track is divided into a number of data sectors that store data blocks of a fixed size.

Data are stored and accessed on the discs by an array of read/write heads mounted to a rotary actuator assembly, or "E-block." Typically, the E-block includes a plurality of actuator arms which project outwardly from an actuator body to form a stack of vertically spaced actuator arms. The stacked discs and arms are configured so that the surfaces of the stacked discs are accessible to the heads mounted on the interleaved stack of actuator arms.

Head wires included on the E-block conduct electrical signals from the heads to a flex circuit, which in turn conducts the electrical signals to a flex circuit bracket mounted to a disc drive basedeck. For a discussion of some modern E-block assembly techniques, see U.S. Pat. No. 5,404,636 entitled "Method of Assembling a Disk Drive Actuator" issued Apr. 11, 1995 to Stefansky et al., and assigned to the assignee of the present invention.

The actuator body pivots about a cartridge bearing assembly which is mounted to the disc drive housing at a position closely adjacent the outer extreme of the discs. The actuator assembly includes a voice coil motor which enables the actuator arms and the heads attached thereto to be rotated about the cartridge bearing assembly so that the arms move horizontally (i.e. in a plane parallel to the surfaces of the discs) to selectively position a head adjacent to a preselected data track.

The voice coil motor includes a coil mounted radially outwardly from the cartridge bearing assembly, the coil being immersed in the magnetic field of a magnetic circuit of the voice coil motor. The magnetic circuit comprises one or more permanent magnets and magnetically permeable pole pieces. When current is passed through the coil, an electromagnetic field is established which interacts with the magnetic field of the magnetic circuit so that the coil moves in accordance with the well-known Lorentz relationship. As the coil moves, the actuator body pivots about the pivot shaft and the heads move across the disc surfaces.

Each of the heads is mounted to an actuator arm by a flexure which attaches to the end of the actuator arm. Each head includes an interactive element such as a magnetic transducer which either senses the magnetic transitions on a selected data track to read the data stored on the track, or transmits an electrical signal that induces magnetic transitions on the selected data track to write data to the data track. Air currents are caused by the high speed rotation of the discs. A slider assembly included on each head has an air bearing surface which interacts with the air currents to cause the head to fly at a short distance above the data tracks on the disc surface.

There is a generally recognized trend in the industry to increase track density, making more and more accurate track following necessary. At the same time, increasing disc rotation speeds have resulted in more and more noise energy being transferred to each arm and head-gimbal assembly by wind. This acts as a disturbance having energy distributed across a wide spectrum of frequencies. This makes accurate track following difficult, especially when it includes significant energy at any of the resonance frequencies of the arms. Thus, there is a need for an improved technique for reducing wind-induced disturbances upon arms and head-gimbal assemblies of the disc drive.

Meanwhile, there has been a trend among disc drive manufacturers to construct drives of various capacities, for a given housing size or "form factor." Once a design is complete for a "fully populated" disc drive, one or more modified designs of so-called "de-populated" disc drives are hastily generated. This widespread approach merely scales down the fully populated design, failing to recognize the synergy achievable by optimizing a de-populated design. Thus, there is a need for ways to take appropriate advantage of this opportunity.

The present invention provides a solution to these and other problems, and offers other advantages over the prior art.

SUMMARY OF THE INVENTION

It has been observed that disc drives with more than one disc show considerably more non-repeatable runout (NRRO) on inner heads (i.e. between discs). To alleviate this, an original multi-disc design is adapted by (a) reducing the number of discs in the stack and (b) configuring the drive of the adapted design with a larger nominal inter-disc separation than that of the original design. In one embodiment, the larger separation is maintained by an increased number of disc spacers between each consecutive pair of the discs in the disc stack of the modified design. The result of such a design adaptation is a disc drive with better performance characteristics than would exist by the original design. For example, because of a reduced level of windage-induced NRRO, the disc drive of the adapted design can permit data tracks servo-written at a higher density than would otherwise be feasible.

These and various other features as well as additional advantages which characterize the present invention will be apparent from a reading of the following detailed description and a review of the associated drawings.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include much detail about servo track writing or controlling track density. Neither does it include methods for constructing discs or alternating discs with spacers on clamped disc stacks.

Definitions and clarifications of certain terms are provided in conjunction with the descriptions below, all consistent with common usage in the art but some described with greater specificity. A "design" of a disc drive, for example, refers herein to a mechanical and electrical description of the disc drive that is generally considered sufficient to permit the disc drive to be constructed without significant creativity. A so-called "de-populated" disc drive conventionally refers to one having a lower number of discs and/or heads than an otherwise similar "original" disc drive design upon which its design is based. "NRRO" conventionally refers to 3-sigma non-repeatable runout, three times a calculated standard deviation of radial positions measured relative to an ideal track center. Except as noted, NRRO dimensions are given in microinches, which is standard in the disc drive industry.

Figure 1:
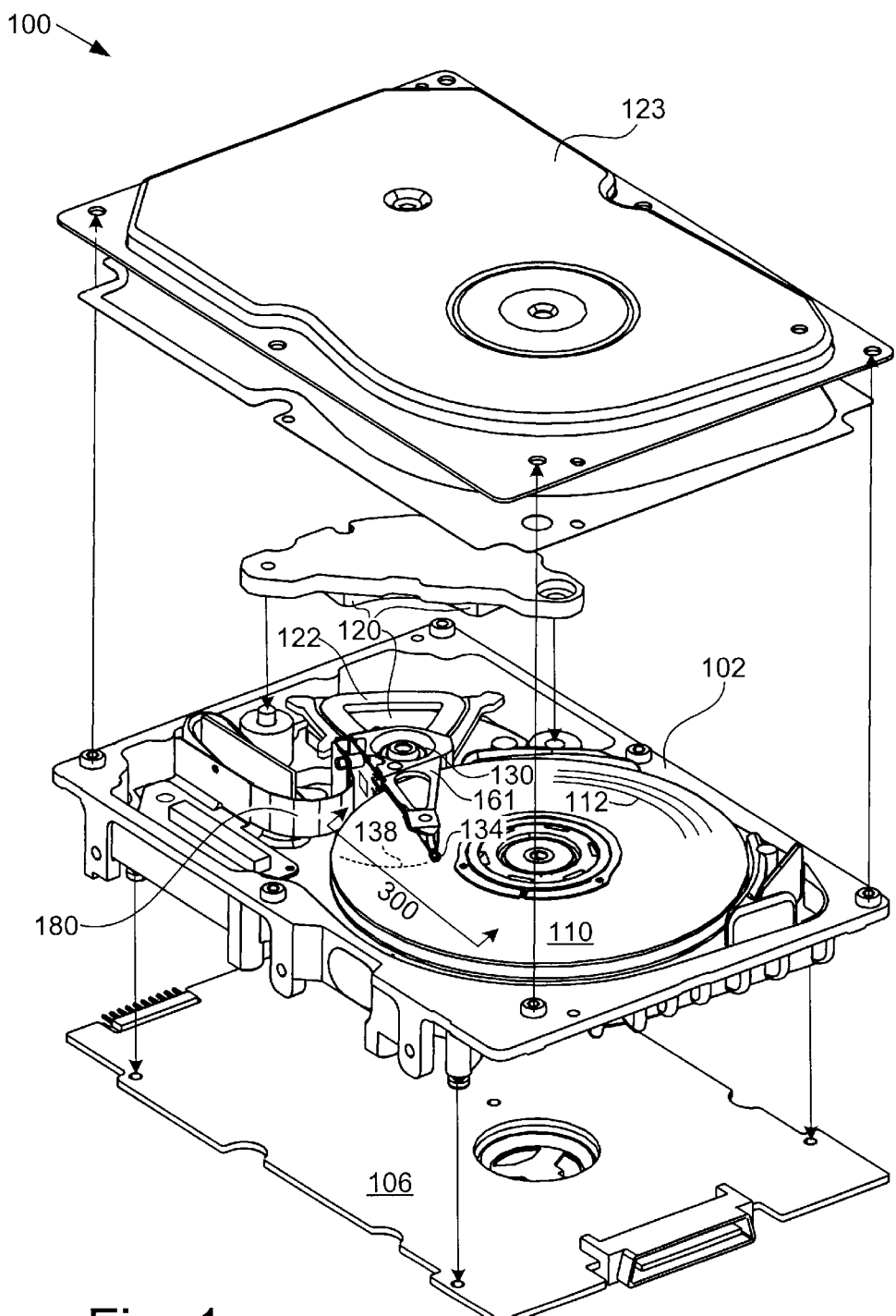
FIG. 1 shows a partially exploded, fairly complete view of a data storage device constructed in accordance with the present invention.

Turning now to FIG. 1, there is shown a data storage device 100 constructed in accordance with a preferred embodiment of the present invention. Device 100 is a disc drive including base 102 to which various components are mounted. Top cover 123 cooperates with base 102 conventionally to form a sealed chamber. The components include a spindle motor which rotates data storage discs 110 at several thousand revolutions per minute. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms which extend above and below each disc 110, with one or more flexures extending from each of the actuator arms. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. Flex cable 180 maintains an electrical connection by flexing as heads 134 traverse tracks 112 along their respective radial paths 138. By "radial," it is meant that path 138 is substantially aligned with a radius of the disc(s) 110, although their directions may be offset from a perfectly radial direction (such as 115) by up to about 20 degrees due to head skew, as is understood in the art.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magnets 120 and coil 122 so that coil 122 moves. As coil 122 moves, actuator assembly 161 pivots about bearing shaft assembly 130 and transducer heads 134 are caused to move across the surfaces of discs 161 between the inner diameter and outer diameter of the disc(s) 161. Fine control of the position of head 134 is optionally made with a microactuator (not shown) that operates between the head 134 and the actuator arm. Finally, a side view indicator 300 is shown to illustrate how actuator assembly 161 is situated with respect to discs 110 in conjunction with an embodiment of the invention depicted in FIG. 3.

Figure 2:
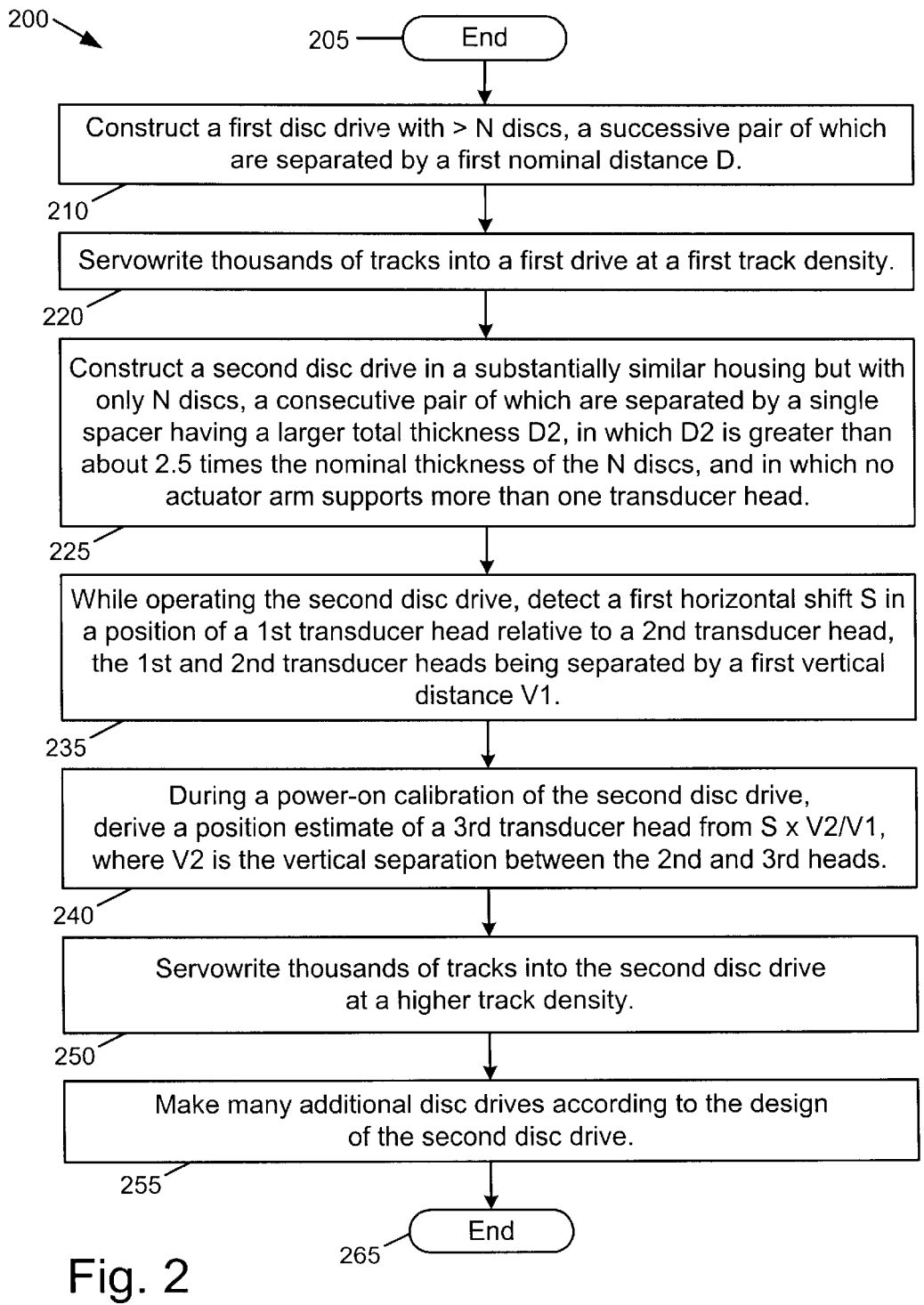
FIG. 2 shows a method of the present invention for constructing and operating disc drives according to an improved design.

FIG. 2 shows a method 200 of the present invention comprising steps 205 through 265. A first disc drive is constructed with several discs, a successive pair of which are separated by a first nominal distance 210. Tracks are written into the drive at a first track density 220. A second disc drive is constructed similar to the first but with a larger disc separation distance and only one head per actuator arm 225.

It should be noted that a typical rotary actuator can move enough to change the head-to-head skew by several tracks (if radial) and/or several bits (if circumferential). These shifts can be caused by mechanical disturbances such as thermal variations. This shift was not especially significant under a prior art method, which simply used each head's position (with a static offset) to derive an initial estimate for a position of a consecutive head's position. Unfortunately, this method is not generally effective for estimating a position of a head having a more substantial vertical separation between heads, such as exist with the use of the present invention.

To address this problem, a method is presented that is effective for estimating head position during a head switch during servo writing, certification or normal operation. A first horizontal shift S is detected between first and second transducer heads (see 331,332 of FIG. 3). To prepare for a head switch to a third transducer head (see 333 of FIG. 3), a position estimate is derived from the shift S and a ratio of the known vertical distances V1 & V2. In one embodiment, this dynamic mechanical shift estimate (S×V2/V1) is simply added to a conventional initial estimate of the third transducer head's positions Before or after the optional head switch adjustment method of steps 235 & 240, the a second disc drive is servo written 250. (Note that a higher track density will generally be possible by virtue of the reduced NRRO resulting from the larger inter-disc spacing in the second drive.) Additional disc drives are then made according to the second disc drive 255.

Figure 3:
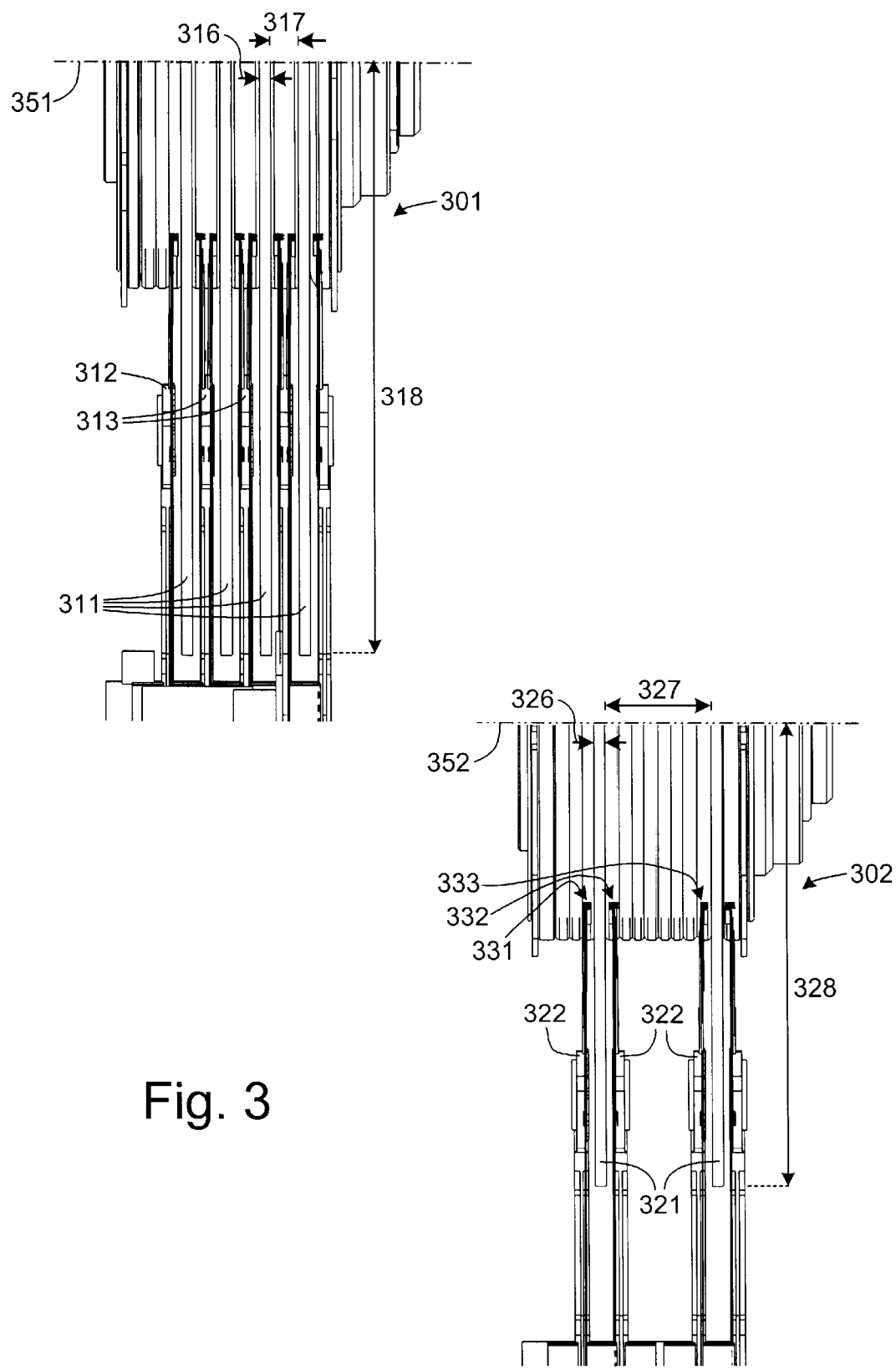
FIG. 3 shows key portions of a prototype disc drive and of a modified-design disc drive made according to the method of FIG. 2.

Turning now to FIG. 3, there are shown key portions of a prototype disc drive 301 and of a modified-design disc drive 302 made according to the method of FIG. 2. Prototype disc drive 301 has four discs 311 rotating about axis 351. The discs each have nominal thickness 316 and nominal radius 318. Between each two consecutive discs in the stack, there is a nominal separation distance 317. Outer arms 312 are shown above the top disc and below the bottom disc, each supporting one transducer head. Three inner arms 313 are shown, each interleaved between two consecutive discs, each inner arm 313 supporting two heads facing in opposite directions to access a respective data surface.

Modified-design disc drive 302 has two discs 321 rotating about axis 352. The discs each have nominal thickness 326 (equal to 316) and nominal radius 328 (less than 318). Between discs 321 is a nominal separation distance 327 several times larger than 317. Two inner & two outer arms 322 each supports only one transducer head 331,332,333. With this structure, each of the arms experiences a similar amount of windage-induced NRRO, and each performs similarly.

In accordance with the preferred embodiment described above with reference to steps 235 & 240 of FIG. 2, vertical offset values between heads are given. It should be understood that V1 of step 240 can be estimated as nominal thickness 326, and that V2 of step 240 can be estimated as separation distance 327.

Figure 4:
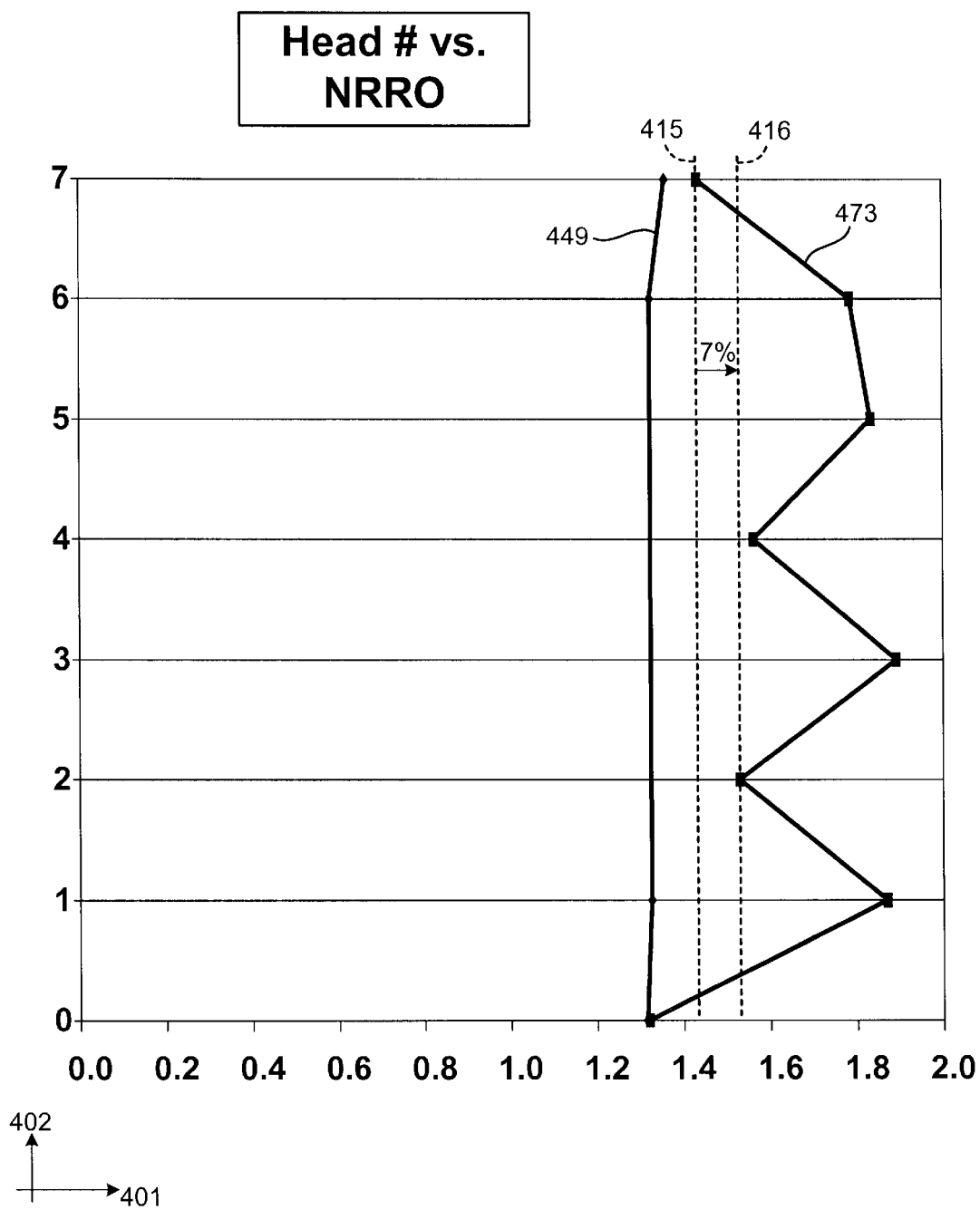
FIG. 4 shows how NRRO is much worse for "inner heads" in a fully-populated disc drive but not for a particular drive of the present invention.

Turning now to FIG. 4, head number 402 is plotted against NRRO 401. Data plot 473 shows the performance of a fully populated disc drive like that of item 301 in FIG. 3. To varying degrees, heads between the discs (i.e. heads 1 through 6) generally suffer much more windage-induced NRRO than end-arm heads 0 and 7. (As used herein and consistent with industry usage, "much more" means at least about 10% more.) Data plot 449 shows a comparable performance indicator of a de-populated disc drive like that of item 302 in FIG. 3. (Note that heads 2 through 5 are absent, those corresponding to the two middle discs that have been removed in the present de-populated design.) The worst-case head (i.e. head 7) of the de-populated design has an NRRO not much more than that of the best-case head (i.e. head 0).

Figure 5:
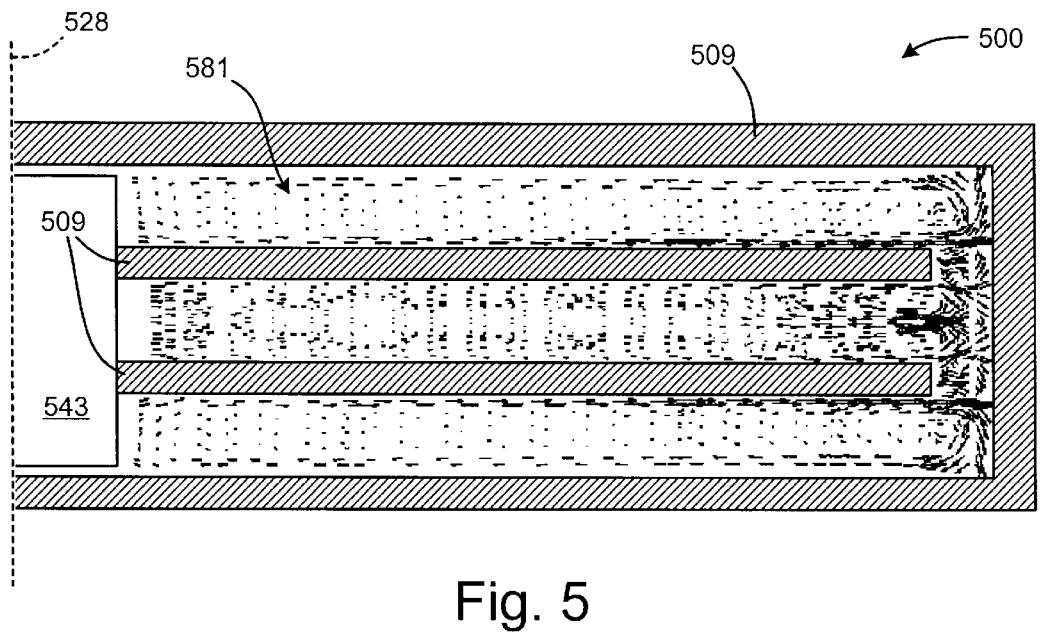
FIGS. 5&6 show an air flow model of a closely-spaced pair of discs, illustrating why windage causes NRRO for inner heads in conventional fully-populated and de-populated disc drives.
Figure 6:
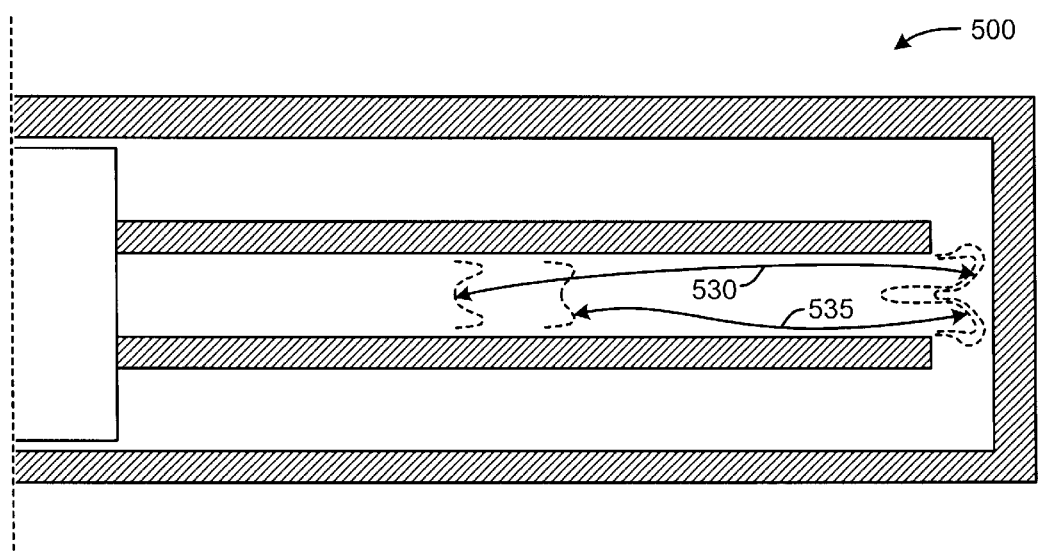

FIG. 5 shows a finite element model (generated by FLUENT 5.0 software) of a disc drive 500 having two discs 509 supported on a spindle 543 rotating within a chamber 509 and about an axis 528. Direction lines show substantially inward air flow along the edges of the chamber 509 and substantially outward air flow along the surfaces of the discs 509. From the same model, FIG. 6 shows the regions of fastest air flow. Only within region 530 does the flow speed exceed 30 meters per second, and only within region 535 does the flow speed exceed 35 meters per second. In present-day disc drives, flow speeds of these magnitudes induce a significant disturbance upon actuator arms, particularly when the heads are near their innermost tracks.

Figure 7:
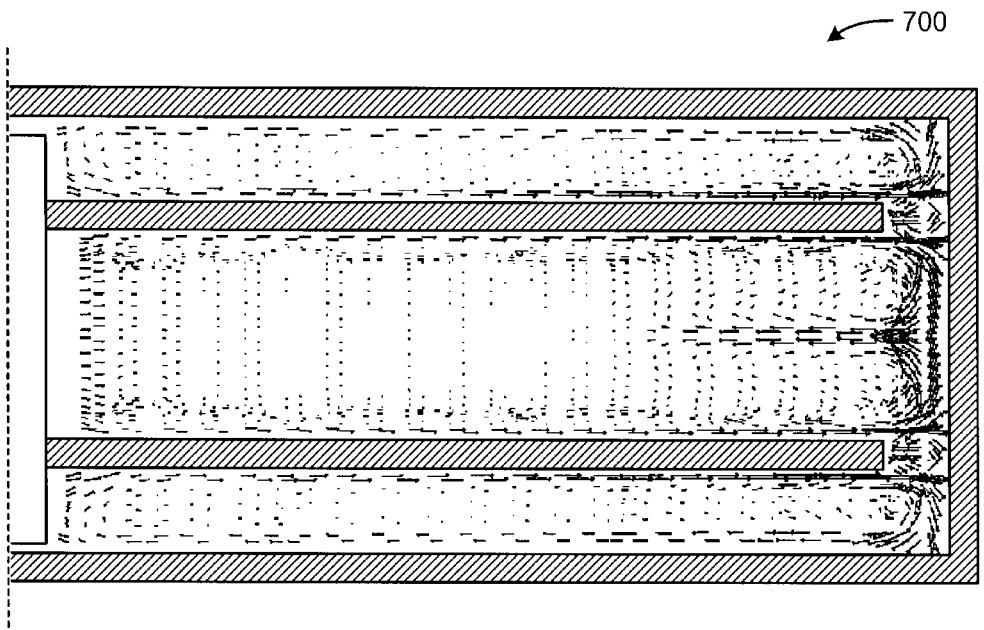
FIGS. 7&8 show an air flow model for a pair of discs maintained at a greater inter-disc separation, illustrating how the present invention can be used to create higher-performance disc drives of a de-populated design.
Figure 8:
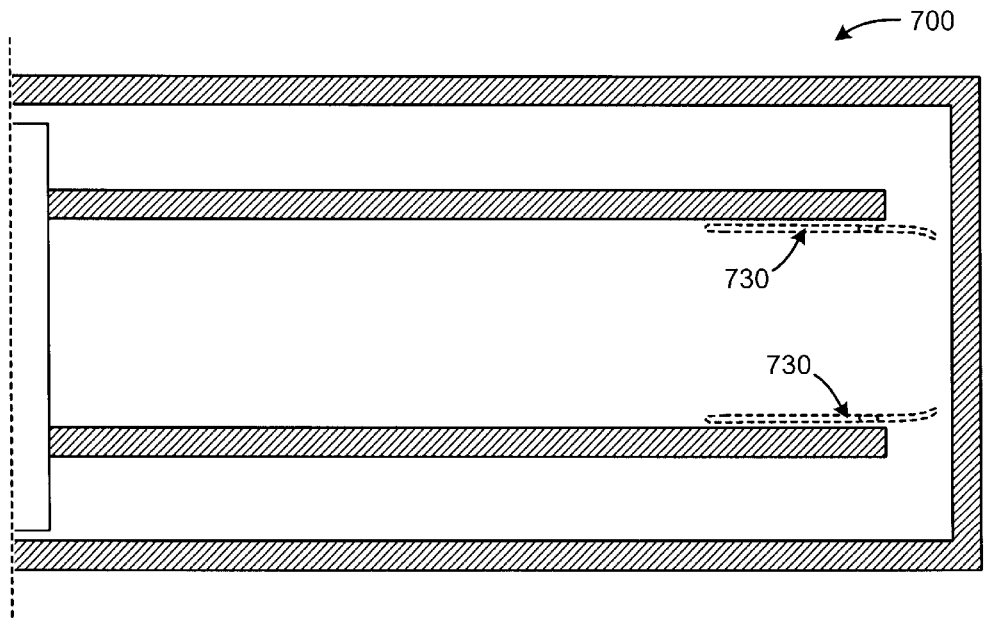

FIGS. 7&8 show a similar finite element model of a disc drive 700, likewise generated by FLUENT 5.0 software but with a much larger vertical separation between discs. Note that no air flow exceeding 35 meters per second is expected, and that only two small pockets of air flow exceeding 30 meters per second are expected.

Alternatively characterized, a first embodiment of the present invention is a method for making a modified-design disc drive having a plurality of (N) coaxially stacked data storage discs. An original disc drive (such as 301) is first constructed (such as by step 210) with more than N original-type discs (such as 311) are within a first housing (such as 102 with 123), a successive pair of the original-type discs being separated by a first nominal distance D (such as 317). Then, the modified-design disc drive(s) are constructed (such as by step 225) so that each consecutive pair of the discs are separated by a greater nominal distance (such as 327).

In a second embodiment, the original disc drive further includes an inner head (such as 313) that suffers much more windage-induced non-repeatable runout than an outer head (such as 312) suffers. The modified-design disc drive has an inner head (such as 332) that does not suffer much more windage-induced NRRO than an outer head (such as 331) suffers. Preferably, the method for constructing the modified-design disc drive includes a step placing more spacers between the discs, and does not include any step of supporting two oppositely-facing transducer heads on an actuator arm of the modified-design disc drive (such as that of FIG. 3).

In a third embodiment, a first horizontal shift in a position of a first transducer head relative to a second transducer head is detected (e.g. by step 235). An estimated horizontal position of a third transducer (such as 333) is determined from the shift and from the predetermined estimates of the vertical offsets (such as 326 & 327) from the second head to the first and third heads. This is useful for accounting for actuator tilt when the distance to the third head is several times larger than the distance to the first head, especially during a power-on calibration of the static (horizontal) offsets between heads. It can optionally be accomplished by scaling the detected shift linearly based upon indicators of the vertical distances V1 and V2.

In a fourth embodiment, thousands of tracks are servo-written into each of the two disc drives, the modified-design disc drive being servo-written at a higher nominal track density. This results in a modified-design disc drive that capitalizes on the improved performance resulting from the present drive design modification method. A de-populated disc drive having two discs can thus replace a fully populated disc drive having four, reducing the capacity by less than 50%.

In a fifth embodiment, the modified-design disc drive is constructed with discs thin enough so that D/H is larger for the modified-design disc drive than for the original disc drive, where D is the nominal distance between consecutive discs and where H is the nominal disc thickness. More preferably, the modified-design disc drive's D/H is also greater than about 2.5 (i.e. that of separation 317 relative to thickness 316). Most preferably, the modified-design disc drive's D/H is at least about 9.5 (i.e. that of separation 327 relative to thickness 326).

In a sixth embodiment, the modified-design disc drive is constructed with discs small enough so that D/R is larger for the modified-design disc drive than for the original disc drive, where D is the nominal distance between consecutive discs and where R is the nominal disc radius. More preferably, the modified-design disc drive's D/R is greater than about 0.024 (i.e. that of separation 317 relative to radius 318). Most preferably, the modified-design disc drive's D/R is at least about 0.23 (i.e. that of separation 327 relative to radius 328).

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, adaptations of an original disc drive described herein can be used to improve new "fully populated" disc drive designs, as well as those of the prior art, without departing from the scope and spirit of the present invention. In addition, although the preferred embodiments described herein are largely directed to magnetic disc drives, it will be appreciated by those skilled in the art that many teachings of the present invention can be applied to optical and magneto-optical disc drives without departing from the scope and spirit of the present invention.

What is claimed is:

1. A modified-design disc drive having N coaxially stacked data storage discs, the modified-design disc drive made by a method comprising steps of:
   (a) constructing a first disc drive so that more than N original-type discs are within a first housing, a successive pair of the original-type discs being separated by a first nominal distance D; and
   (b) constructing the modified-design disc drive so that a consecutive pair of the N discs are separated by a second nominal distance D2 greater than D within a second housing substantially similar to the first housing.

2. The disc drive of claim 1 in which the first disc drive has an inner head and an outer head, the inner head suffering much more windage-induced non-repeatable runout (NRRO) than the outer head suffers after the constructing step (b).

3. The disc drive of claim 2 in which the modified-design disc drive has an inner head and an outer head, the inner head not suffering much more windage-induced non-repeatable runout (NRRO) than the outer head suffers after the constructing step (b).

4. The disc drive of claim 1 in which the constructing step (a) includes a step (a1) of placing a quantity S of spacers between the successive pair of the prototype discs, and in which the constructing step (b) includes a step (b1) of placing a number of spacers larger than S between the successive pair of the N data storage discs.

5. The disc drive of claim 1 in which the constructing step (a) is performed with the original-type discs having a first nominal radius R, and in which the constructing step (b) is performed with the N discs having a second nominal radius R2 such that D2/R2>D/R.

6. The disc drive of claim 1 in which the method further comprises steps of:
   (c) detecting a first horizontal shift in a position of a first transducer head relative to a second transducer head, the first and second transducer heads being separated by a first vertical distance V1; and
   (d) predicting a position of a third transducer head based upon the first shift, the third transducer head being vertically separated from the second transducer head by a second vertical distance V2 several times larger than the first vertical distance V1.

7. The disc drive of claim 6 in which the predicting step (d) is performed during a power-on calibration.

8. The disc drive of claim 6 in which the predicting step (d) includes a step (d1) of scaling the shift detected in step (c1) linearly based upon indicators of the vertical distances V1 and V2.

9. The disc drive of claim 1 in which the constructing step (a) includes a step (a1) of supporting two oppositely-facing transducer heads on an actuator arm of the first disc drive, and in which the constructing step (b) does not include any step of supporting two oppositely-facing transducer heads on an actuator arm of the modified-design disc drive.

10. The disc drive of claim 9 in which the first disc drive has an inner head and an outer head, the inner head suffering much more windage-induced non-repeatable runout (NRRO) than the outer head suffers after the constructing step (b).

11. The disc drive of claim 9 in which the modified-design disc drive has an inner head and an outer head, the inner head not suffering much more windage-induced non-repeatable runout (NRRO) than the outer head suffers after the constructing step (b).

12. The disc drive of claim 1 in which the constructing step (a) includes a step (a1) of writing thousands of tracks into the first disc drive at a first track density, and in which the constructing step (b) includes a step (b1) of writing thousands of tracks into the modified-design disc drive at a second track density higher than the first track density.

13. The disc drive of claim 12 in which the first disc drive has an inner head and an outer head, in which the inner head suffers much more windage-induced non-repeatable runout (NRRO) than the outer head suffers after the constructing step (b), in which the modified-design disc drive has an inner head and an outer head, and in which the inner head does not suffer much more windage-induced non-repeatable runout (NRRO) than the outer head suffers after the constructing step (b).

14. The disc drive of claim 12 in which the method further comprises steps of:
   (c) detecting a first horizontal shift in a position of a first transducer head relative to a second transducer head, the first and second transducer heads being separated by a first vertical distance V1; and
   (d) predicting a position of a third transducer head based upon the first shift, the third transducer head being vertically separated from the second transducer head by a second vertical distance V2 several times larger than the first vertical distance V1.

15. The disc drive of claim 12 in which the constructing step (a) includes a step (a1) of supporting two oppositely-facing transducer heads on an actuator arm of the first disc drive, and in which the constructing step (b) does not include any step of supporting two oppositely-facing transducer heads on an actuator arm of the modified-design disc drive.

16. The disc drive of claim 1 in which at least 4 original-type discs are within the first housing when the constructing step (a) is completed.

17. The disc drive of claim 16 in which the first disc drive has an inner head and an outer head, in which the inner head suffers much more windage-induced non-repeatable runout (NRRO) than the outer head suffers after the constructing step (b), in which the modified-design disc drive has an inner head and an outer head, and in which the inner head does not suffer much more windage-induced non-repeatable runout (NRRO) than the outer head suffers after the constructing step (b).

18. The disc drive of claim 16 in which the method further comprises steps of:
   (c) detecting a first horizontal shift in a position of a first transducer head relative to a second transducer head, the first and second transducer heads being separated by a first vertical distance V1; and
   (d) predicting a position of a third transducer head based upon the first shift, the third transducer head being vertically separated from the second transducer head by a second vertical distance V2 several times larger than the first vertical distance V1.

19. The disc drive of claim 16 in which the constructing step (a) includes a step (a1) of supporting two oppositely-facing transducer heads on an actuator arm of the first disc drive, and in which the constructing step (b) does not include any step of supporting two oppositely-facing transducer heads on an actuator arm of the modified-design disc drive.

20. The disc drive of claim 16 in which the constructing step (a) includes a step (a1) of writing thousands of tracks into the first disc drive at a first track density, and in which the constructing step (b) includes a step (b1) of writing thousands of tracks into the modified-design disc drive at a second track density higher than the first track density.

21. The disc drive of claim 1 in which the constructing step (a) is performed with the original-type discs having a first nominal thickness H, and in which the constructing step (b) is performed with the N discs having a second nominal thickness H2 such that D2/H2 is greater than about 2.5.

22. The disc drive of claim 21 in which the constructing step (b) includes a step (b1) of configuring the N discs so that D2/H2 is at least about 9.5.

23. A disc drive made by modifying an original disc drive design featuring an original nominal inter-disc separation, the disc drive comprising:

a coaxial stack including a plurality of discs; and means for maintaining a separation between consecutive ones of the discs that is larger than the original inter-disc separation.

24. The disc drive of claim 23 in which the coaxial stack includes exactly two discs.

25. The disc drive of claim 23 in which the original disc drive design includes an original nominal inter-disc spacer thickness, and in which the means is an inter-disc spacer having a thickness grater than the original nominal thickness, the inter-disc spacer positioned between a consecutive pair of the plurality of discs.

26. The disc drive of claim 23, further comprising:

first, second and third transducers; and means for using measured positions of the first and second transducers to estimate a position of the third transducer.

27. The disc drive of claim 23, further comprising several actuator arms interleaved with the discs, each actuator arm supporting exactly one transducer head.

28. The disc drive of claim 23 in which a track density of the plurality of discs is greater than a track density of the original disc drive design.

29. The disc drive of claim 23 in which the disc drive is made according to a modified design produced by de-populating the original disc drive design.

30. The disc drive of claim 23 in which a nominal radius of the plurality of discs is less than a nominal disc radius of the original disc drive design.

* * * * *